(12) United States Patent
Inaba

(10) Patent No.: US 6,478,132 B1
(45) Date of Patent: Nov. 12, 2002

(54) OUTPUT SHAFT OF AUTOMATIC TRANSMISSION

(75) Inventor: Tetsuya Inaba, Shizuoka (JP)

(73) Assignee: Jatco Transtechnology Ltd., Fuji (JP)

( * ) Notice: Subject to any disclaimer, the term of this patent is extended or adjusted under 35 U.S.C. 154(b) by 0 days.

(21) Appl. No.: 09/691,238

(22) Filed: Oct. 19, 2000

(30) Foreign Application Priority Data

Oct. 19, 1999 (JP) .......................................... 11-296509

(51) Int. Cl.[7] .............................................. F16H 57/02
(52) U.S. Cl. .............................. 192/219.4; 192/110 R; 192/110 S
(58) Field of Search .......................... 192/219.4, 110 R, 192/110 S, 219.5, 219.6, 219.7; 74/606 R; 180/384

(56) References Cited

U.S. PATENT DOCUMENTS

| | | | | |
|---|---|---|---|---|
| 3,631,947 A | * | 1/1972 | Laing | 192/4 A |
| 3,814,222 A | * | 6/1974 | Koivunen | 192/4 A |
| 4,907,681 A | * | 3/1990 | Kuusik | 192/4 A |
| 6,065,581 A | * | 5/2000 | Nogle | 192/219.3 |

OTHER PUBLICATIONS

Maintenance Manual of Nissan Full–Range Electronic Control Automatic Transmission, pp. 3 sheets, (Mar. 1987).

* cited by examiner

*Primary Examiner*—Saul Rodriguez
(74) *Attorney, Agent, or Firm*—Foley & Lardner

(57) ABSTRACT

An output shaft of an automatic transmission is constituted by a first output shaft outputting a driving force from a gear train of an automatic transmission and a second output shaft connected to the first output shaft so as to be movable in an axial direction and to be fixed in a rotational direction with respect to the first output shaft. The second output shaft is integral with a parking gear which fixes the second output shaft in rotation when the automatic transmission is set at a parking position. This arrangement improves applicability to the change of a longitudinal dimension of an automatic transmission and suppresses vibrations from being inputted from driving wheels to a gear train.

7 Claims, 9 Drawing Sheets

FIG.2

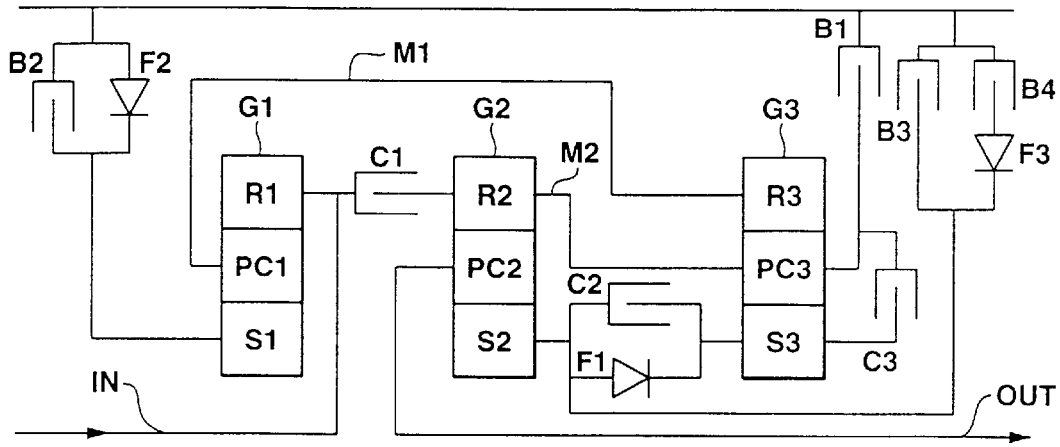

FIG.3

| | C1 | C2 | C3 | B1 | B2 | B3 | B4 | F1 | F2 | F3 |
|---|---|---|---|---|---|---|---|---|---|---|
| 1st | | (O)* | | | ● | (O) | O | | △ | △ |
| 2nd | | | O | | (O) | (O) | O | | △ | △ |
| 3rd | | O | O | | (O) | | ● | C | △ | |
| 4th | O | O | O | | | | ● | C | | |
| 5th | O | O | | | O | | ● | C | C | |
| Rev | | O | | O | O | | | | △ | △ |

△ : CONCERNED IN TORQUE TRANSMISSION DURING POWER ON

C : CONTRIBUTE TO TORQUE TRANSMISSION DURING COAST

● : ALTHOUGH OIL PRESSURE IS SUPPLIED TO FRICTION ELEMENT, NO FUNCTION AFFECTS OUTPUT (O) : ENGAGED AT OVERRUN MODE (O)* : ENGAGED AT SELECT CINDITION, THEREAFTER RELEASED EXCEPTED FOR OVERRUN MODE

O : ENGAGED

OUTPUT SHAFT OF AUTOMATIC TRANSMISSION

BACKGROUND OF THE INVENTION

The present invention relates to a structure of an output shaft through which driving force outputted from a vehicular automatic transmission is transmitted to driving wheels.

Generally, a conventional output shaft of an automatic transmission is configured as shown on page I-7 in a publication "Maintenance Manual of Nissan Full-Range Electronic Control Automatic Transmissions" published on March 1987. FIG. 13 shows a schematic structure of this conventional automatic transmission including a conventional output shaft 108. The automatic transmission comprises a converter case 101, a transmission case 102 and a rear extension 103. An input shaft 107 transmits a driving force of an engine from a torque converter 104 in the converter case 101 to a gear train 105 in the transmission case 102. The driving force is varied in rotation speed by the gear train 105 and is transmitted to driving wheels through the output shaft 108 and a flange companion. The output shaft 108 has oil passages for lubricating sliding portions of the automatic transmission. A parking gear 109 for fixing driving wheels during a parking condition is fixedly connected to the output shaft 108 in the rear extension 103.

SUMMARY OF THE INVENTION

However, since this conventional output shaft 108 has been configured to one piece structure extending from the gear train 105 to the flange companion 110, it is necessary to change the output shaft 108 when an axial dimension of an automatic transmission is changed according to the change of vehicle variety. Further, when this output shaft structure is employed to an automatic transmission for four wheel drive (4WD) vehicle, it is necessary to install a 4WD unit at a part corresponding to the rear extension 103. However, this 4WD arrangement requires to completely replace the output shaft 108 with a different output shaft for 4WD. Furthermore, this conventional one-piece structure of the output shaft 108 increases difficulties in machining oil passages according to the elongation of the axial dimension of the output shaft 108. Additionally, since the output shaft 108 is directly connected to the flange companion 110, there is a tendency that the gear train 105 receives the load input including bending force and thrust force from driving wheels.

It is therefore an object of the present invention to provide an improved output shaft structure which solves the above-mentioned problems.

An output shaft of an automatic transmission according to the present invention comprises a first output shaft which outputs a driving force from a gear train of an automatic transmission and a second output shaft which is connected to the first output shaft so as to be movable in an axial direction and to be fixed in a rotational direction with respect to the first output shaft. The second output shaft is integral with a parking gear which fixes the second output shaft in rotation when the automatic transmission is set at a parking position.

BRIEF DESCRIPTION OF THE DRAWINGS

FIG. 2 is a skeleton view showing the automatic transmission of the embodiment according to the present invention.

FIG. 3 is a table showing the engagement logic employed in the automatic transmission of the embodiment according to the present invention.

DETAILED DESCRIPTION OF THE INVENTION

Referring to FIGS. 1 to 12, there is shown an embodiment of an output shaft structure employed in an automatic transmission in accordance with the present invention.

Figure 1:
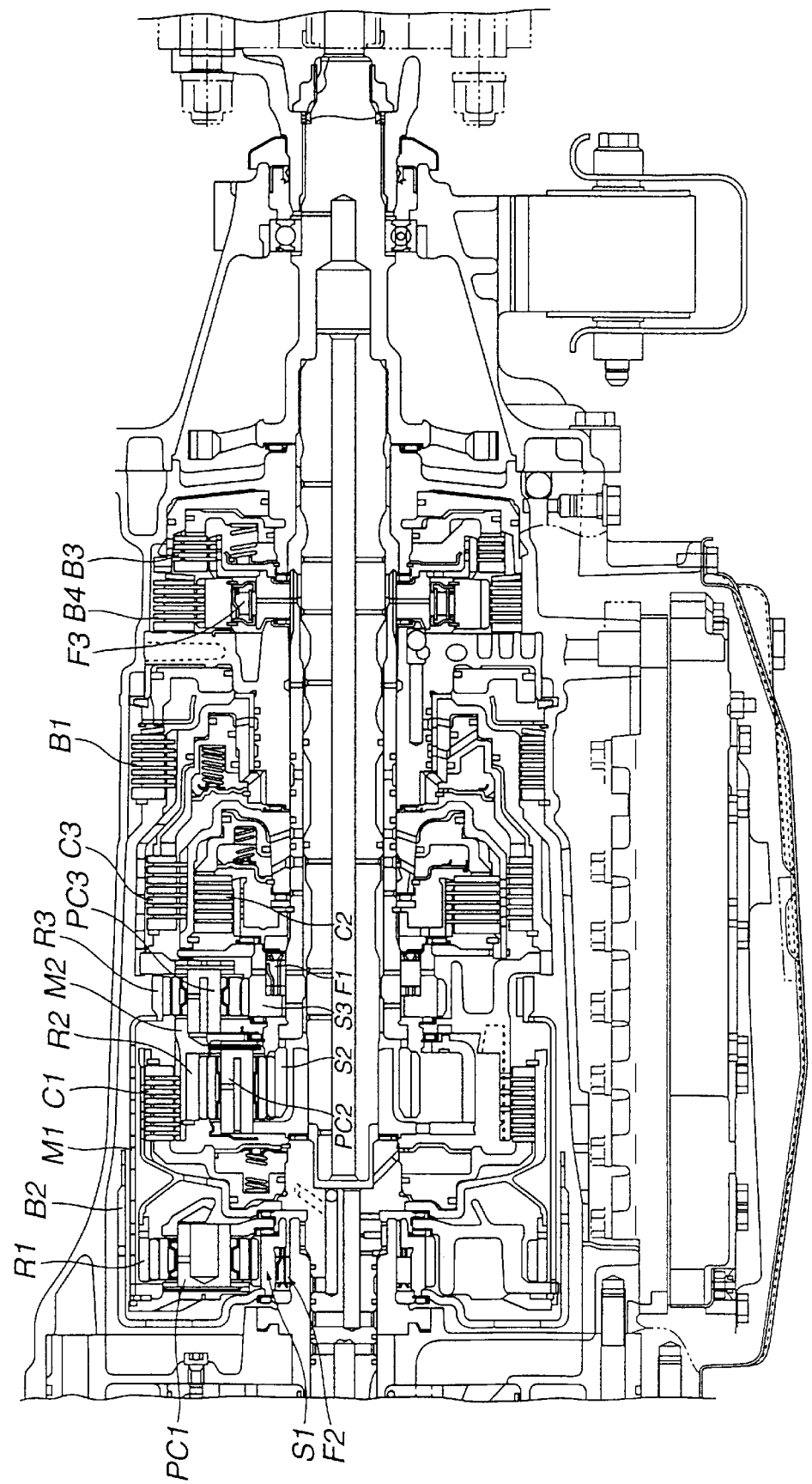
FIG. 1 is a cross sectional view showing a structure of an automatic transmission to which an output shaft structure according to the present invention is employed.

FIG. 1 shows a whole structural view of a transmission mechanism for an automatic transmission according to the present invention. FIG. 2 shows a skeleton view of FIG. 1. The transmission mechanism of the automatic transmission comprises first, second and third planetary gear sets G1, G2 and G3, first, second and third interconnecting members M1, M2 and M3, first, second and third clutches C1, C2 and C3, first, second and third fourth brakes B1, B2, B3 and B4, first, second and third one-way clutches F1, F2 and F3, an input shaft IN and an output shaft OUT.

The first planetary gear set G1 comprises a first sun gear S1, a first ring gear R1, pinions P1 engaged with the first sun gear S1 and the first ring gear R1, and a first carrier PC1 supporting the pinions P1. Similarly, the second planetary gear set G2 comprises a second sun gear S2, a second ring gear R2, pinions P2 engaged with the second sun gear S2 and the second ring gear R2, and a second carrier PC2 supporting the pinions P2. Further similarly, the third planetary gear set G3 comprises a third sun gear S3, a third ring gear R3, pinions P3 engaged with the third sun gear S3 and the third ring gear R3, and a third carrier PC3 supporting the pinions P3.

The first interconnecting member M1 integrally connects the first carrier PC1 and the third ring gear R3. The second interconnecting member M2 integrally connects the second ring gear R2 and the third carrier PC3. The first clutch C1 selectively connects and releases the first ring gear R1 with and from the second ring gear R2. The second clutch C2 selectively connects and releases the second sun gear S3 with and from the third sun gear S3. The first one-way clutch F1 is installed between the second sun gear S2 and the third sun gear S2 in parallel to the second clutch C2. The third clutch C3 selectively restricts the rotation between the third carrier PC3 and the third sun gear S3.

The first brake B1 selectively stops the rotation of the second interconnecting member M2. The second brake B2 selectively stops the rotation of the first sun gear S1. The second one-way clutch F2 is installed to the first sun gear S1 in parallel to the second brake B2. The third brake B3 selectively stops the rotation of the second sun gear S2. The fourth brake B4 and the third one-way clutch F3 is arranged in tandem (in series) and is installed to the second sun gear S2 in parallel to the third brake B3. The input shaft IN is interconnected to the first ring gear R1 and transmits the engine rotational force to the first ring gear R1 from an engine through a torque converter. The output shaft OUT is interconnected to the second carrier PC2 and transmits the output rotational force through a final gear to driving wheels.

A transmission hydraulic control apparatus for generating an appropriate hydraulic pressure for shifting to each gear ratio is hydraulically connected to the first to third clutches C1, C2 and C3 and the first to fourth brakes B1, B2, B3 and B4. The transmission hydraulic control apparatus may be of a hydraulic control type, an electronic control type or of a hydraulic and electronic control type.

Shifting Operation

FIG. 3 shows a table showing engagement operation of the automatic transmission gearbox according to the first embodiment of the present invention. FIGS. 4 to 9 show views of torque transmission paths of the automatic transmission set at the respective shift positions.

In FIG. 3, Mark Δ denotes a condition that the marked elements concerns the torque transmission during a power on state. Mark C denotes a condition that the marked element contributes the torque transmission during a coast state. Mark ● denotes a condition that although the hydraulic pressure is supplied to the marked element, no operation affecting the output is executed by the marked element. Mark (○) denotes a condition that an engagement (connection) operation of the marked element is executed during the overrun mode. Mark (○)* denotes a condition that an engagement (connection) operation of the marked element is executed during the select mode and the disengagement (release) operation of the marked element is executed except for overrun mode. Mark ○ denotes an engaged condition of the marked element.

Figure 4:
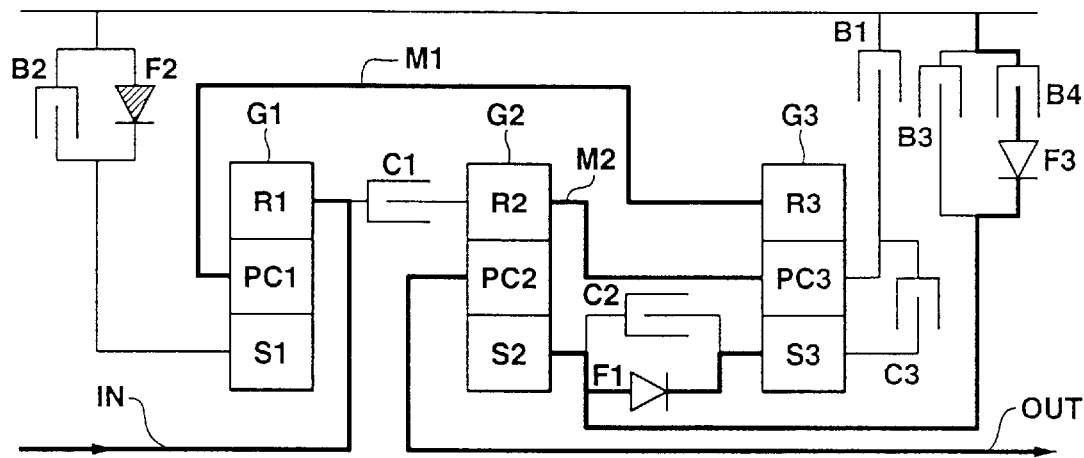
FIG. 4 is a skeleton view showing a torque transmission path when the automatic transmission is set at a first speed.
Figure 5:
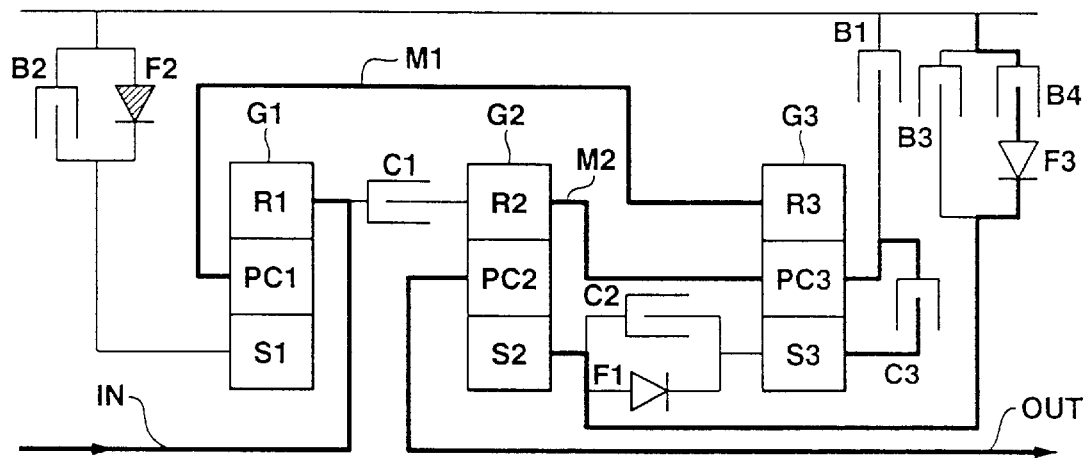
FIG. 5 is a skeleton view showing a torque transmission path when the automatic transmission is set at a second speed.
Figure 6:
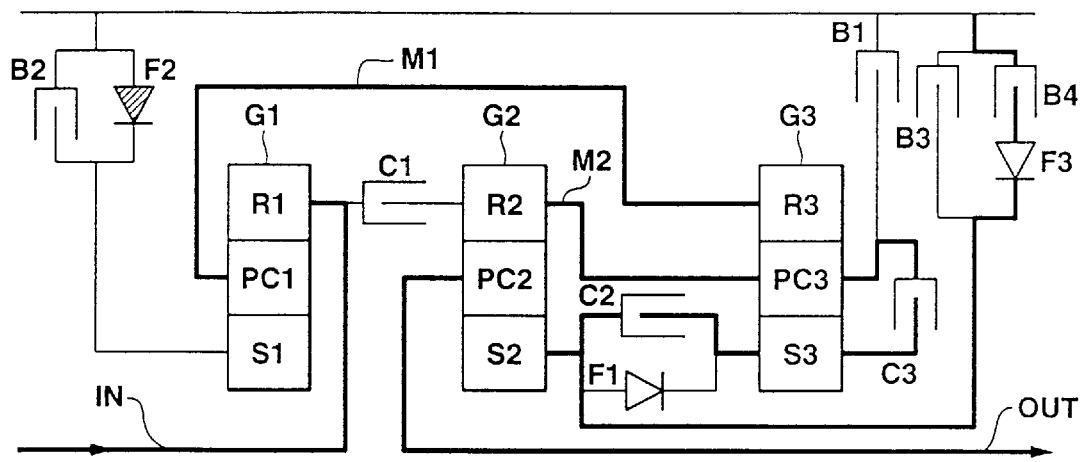
FIG. 6 is a skeleton view showing a torque transmission path when the automatic transmission is set at a third speed.
Figure 7:
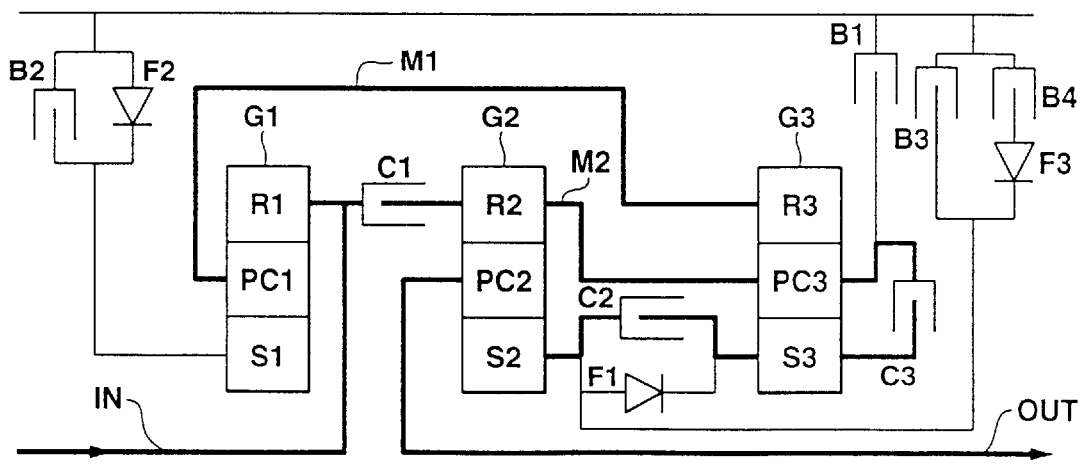
FIG. 7 is a skeleton view showing a torque transmission path when the automatic transmission is set at a fourth speed.
Figure 8:
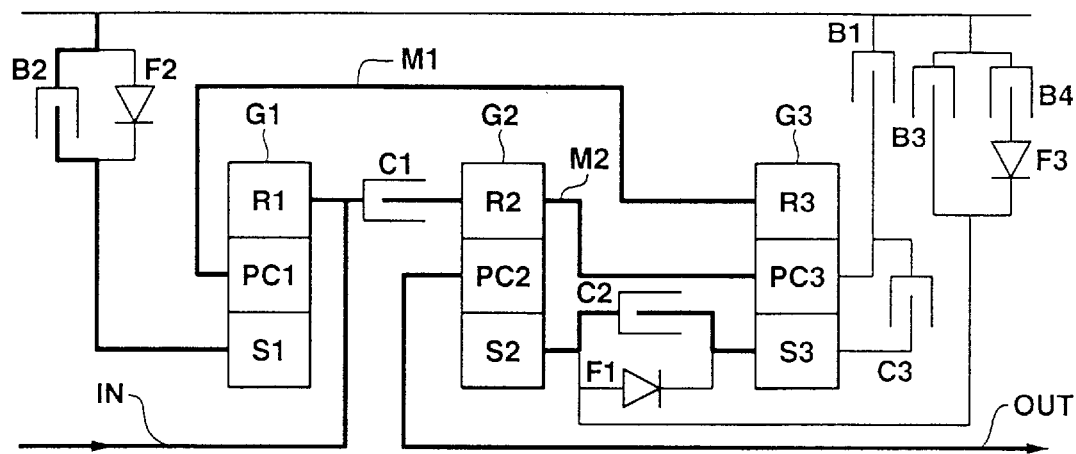
FIG. 8 is a skeleton view showing a torque transmission path when the automatic transmission is set at a fifth speed.
Figure 9:
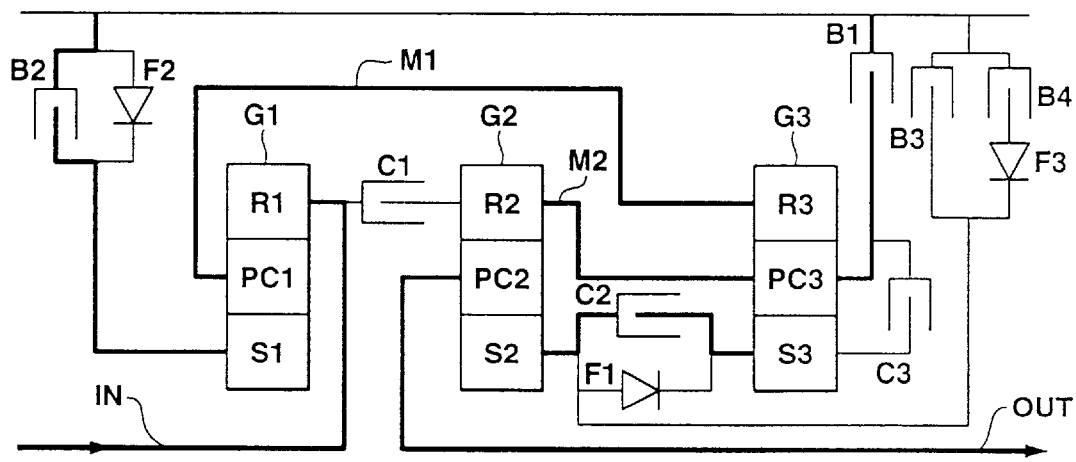
FIG. 9 is a skeleton view showing a torque transmission path when the automatic transmission is set at a reverse speed.

FIG. 4 shows a torque transmission path in the automatic transmission set at a first speed. FIG. 5 shows a torque transmission path in the automatic transmission set at a second speed. FIG. 6 shows a torque transmission path in the automatic transmission set at a third speed. FIG. 7 shows a torque transmission path in the automatic transmission set at a fourth speed. FIG. 8 shows a torque transmission path in the automatic transmission set at a fifth speed. FIG. 9 shows a torque transmission path in the automatic transmission set at a reverse speed.

Figure 10:
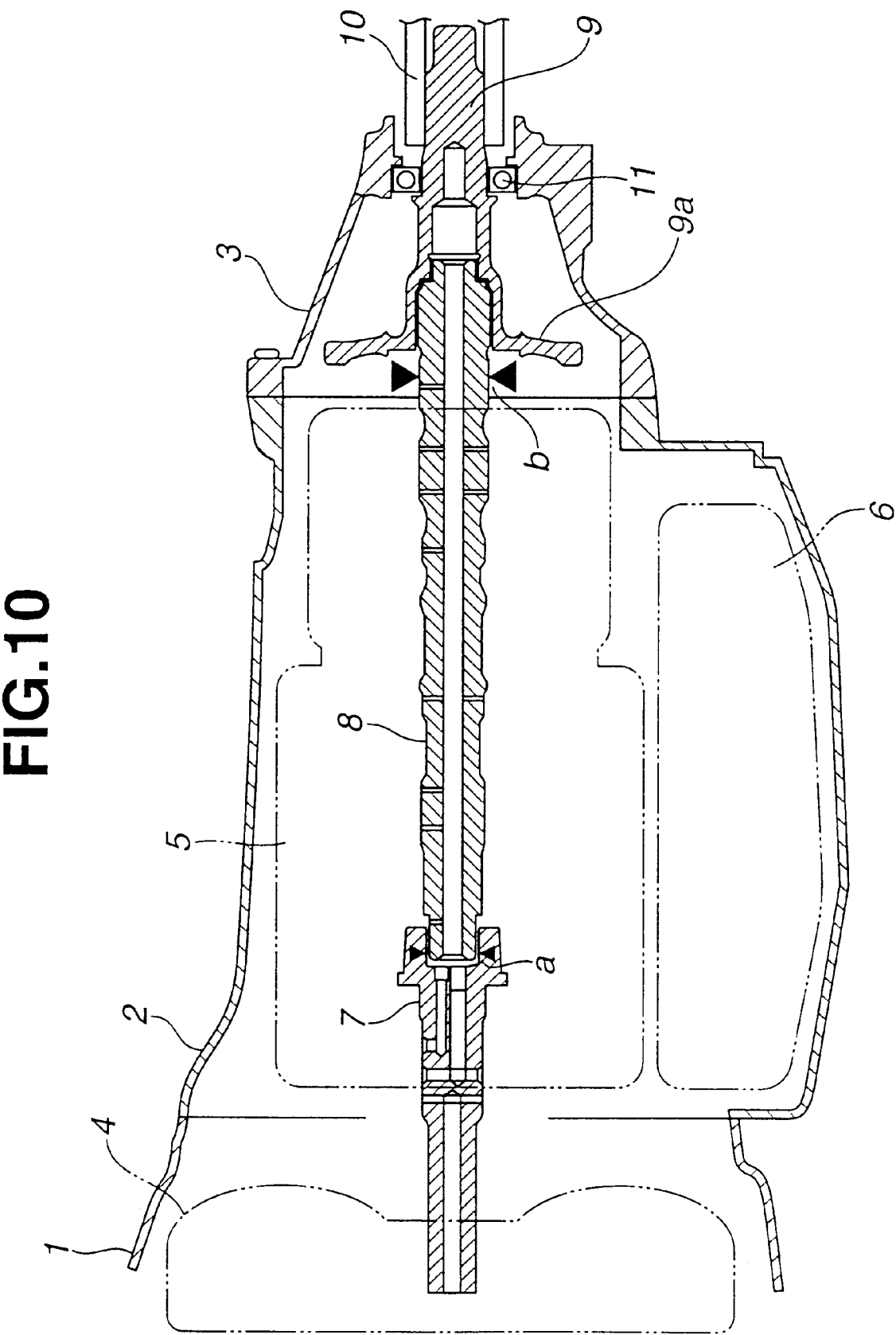
FIG. 10 is a schematic view showing drive shafts of the automatic transmission according to the present invention.

FIG. 10 shows a conceptual view of an automatic transmission to which the embodiment according to the present invention is applied. As shown in FIG. 10, the automatic transmission comprises a converter case 1, a transmission case 2 and a rear extension 3. A torque converter 4 is provided in the converter case 1. A gear train 5 and a control unit 6 are provided in the transmission case 2. An input shaft 7 connects the torque converter 5 and the gear train 6. A first output shaft 8 extends from the gear train 6 to the rear extension 3. The first output shaft 8 has a first end portion supported to the input shaft 7 and a second end portion connected to a first end portion of a second output shaft 9. A major part of the first output shaft 8 is disposed in the transmission case 2. The second output shaft 9 is connected to the first output shaft 8 by means of the spline connection. The first output shaft 8 outputs the driving force from the gear train 5 to the second output shaft 9. A parking gear 9a for fixing a driving shaft during the parking period is integrally connected to the second output shaft 8. A second end portion of the second output shaft 9 is connected to a flange companion 10 to transmit the rotational force to the driving wheels (not shown).

The first output shaft 8 is supported at supporting points a and b shown by marks ▲ shown in FIG. 10. At the supporting point a, the first output shaft 8 is supported to the input shaft through a bush, and at the supporting point b, the first output shaft 8 is supported to an inner periphery (a through-hole defining surface) of a partition wall 2a of the transmission case 2 through a bush 16 (first bearing member).

Figure 11:
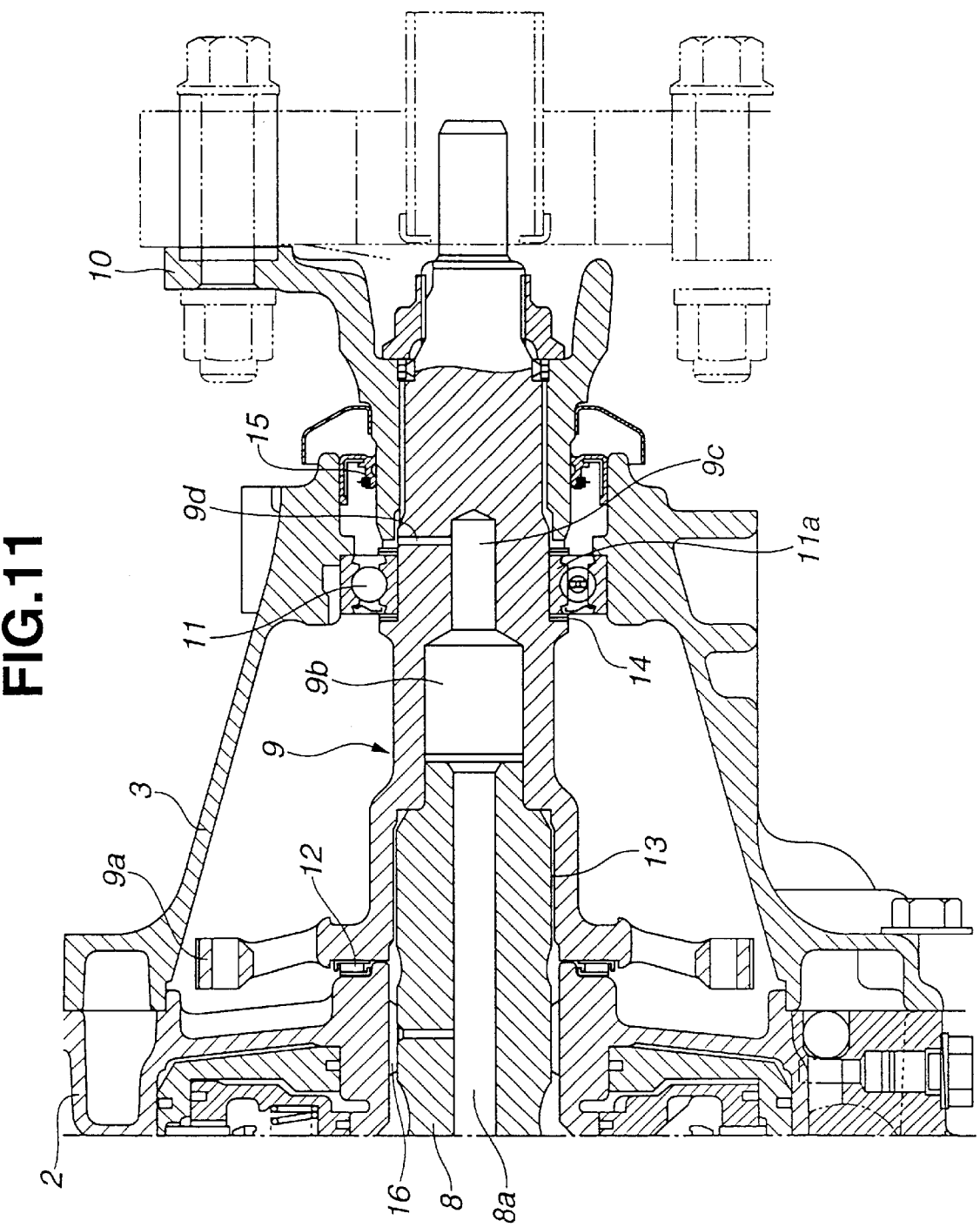
FIG. 11 is an enlarged cross sectional view showing a part of a rear extension of the automatic transmission.

FIG. 11 shows an enlarged cross sectional view of the rear extension 3 according to the present invention. The first output shaft 8 is supported to the transmission case 2 through the bush 16. A lubrication oil passage 8a is provided in the first output shaft 8 so that lubrication oil is supplied to various sliding portions of the automatic transmission through the lubrication oil passage. The lubrication oil passage 8a penetrates the first output shaft 8 along a center axis as shown in FIG. 10. This facilitates the provision of lubrication oil passages.

External splines are provided at an outer periphery at a second end portion of the first output shaft 8, and internal splines are provided an inner periphery at a first end portion of the second output shaft 9. The second end portion of the first output shaft 8 is splined to the first end portion of the second output shaft 9. There is a small clearance at a spline connect portion 13 between the first output shaft 8 and the second output shaft 9. The parking gear 9a is formed at a flange portion located at the end portion of the second output shaft 9 as shown in FIG. 11. The parking gear 9a and the second output shaft 9 are integral with each other, that is, they are made into a one-piece part. The first end portion of the second output shaft 9 is supported to the partition wall 2a of the transmission case 3 through a thrust bearing 12 (second bearing member) in the thrust direction (axial direction). Further, an intermediate portion of the second output shaft 9 is supported to the transmission case 3 through a ball bearing 11 (third bearing member). An inner race 11a of the ball bearing 11 is fixed to the second output shaft 9 by means of washers 14. Two sheets of the washers 14 are inserted to each clearance between the ball bearing 11 and each edged portion of the second output shaft 9 as shown in FIG. 11. Surfaces of the washers 14 are treated with friction lowering material. This surface treatment to the washers 14 prevents the generation of noises caused by releasing of sticks between the inner race 11a and the washer 14 or between the washers 14.

The spline connect portion 13, a hollow portion 9b and oil passages 9c and 9d are formed inside the second output shaft 9. External splines are provided at an outer periphery of the second end portion of the second output shaft 9, and internal splines are provided at an inner periphery of a first end portion of the flange companion 10. The first end portion of the flange companion 10 is splined to the second end portion of the second output shaft 9. An oil seal 15 is installed between an end portion of the rear extension 3 and the flange companion 10.

Next, the manner of operation of the output shaft supporting structure according to the present invention.

The driving force of the torque converter 4 is inputted to the gear train 5 through the input shaft 7. The driving force modified as to the torque and the rotation speed by the gear train 4 is outputted from the first output shaft 8 to the second output shaft 9 in the rear extension 3. The driving force of the first output shaft 8 is transmitted to the second output shaft 9 through the spline connect portion 13. Further, the driving force is transmitted to the driving wheels through the flange companion 19 splined to the second output shaft 9.

The driving force is transmitted to the driving wheels through a universal joint, and therefore there is a tendency that the vibrations due to the road condition or vibrations due to the torque fluctuation are generated in the automatic transmission. Further, during acceleration or deceleration, the transmission tends to generate vibrations directed in the fore and aft direction along the axial direction of the output shafts 8 and 9 (due to inertia). If such vibrations are applied into the gear train 5, it becomes difficult to ensure the durability of the rotation members and gears and construction members of the automatic transmission.

In reply to this problems, the automatic transmission according to the present invention is arranged such that the first output shaft 8 is connected to the second output shaft 9 by means of spline connection at the spline connect portion 13. Further, the flange portion of the parking gear 9a formed at the second end portion of the second output shaft 9 is supported to the transmission case 2 through the thrust bearing 12. Therefore, the automatic transmission employing the structure according to the present invention is capable of reducing the input load, which includes the bending force and thrust force and is inputted from the flange companion 10, by means of the spline connect portion 13 and the partition wall 2a of the transmission case 2. This arrangement improves the durability of the rotation members and gears constituting the gear train 5 in the transmission case.

Since the outer periphery at the second end portion of the first output shaft 8 is connected to the inner periphery of the first end portion of the second output shaft 9 by means of the spline connection, and since the thrust bearing 12 is disposed at the flange portion of the parking gear 9a provided at the outer periphery of the spline connect portion 13, it becomes possible to easily install the thrust bearing 12 and to increase the diameter of the spline connect portion 13 and to decrease the axial dimension of the transmission. Additionally, this arrangement simplifies the structure of the automatic transmission.

Further, by dividing the output shaft into the first output shaft 8 interconnected to the rotation members in the gear train and the second output shaft 9 interconnected to the flange companion 10, it is possible to shorten the length of the oil passage formed in a square portion. This facilitates the machining of the oil passage 8a for lubricating inside portions of the rear extension 3. Further, since it becomes possible to provide a hollow portion 9b in the second output shaft 9, it is possible to decrease the weight of the automatic transmission.

Figure 12:
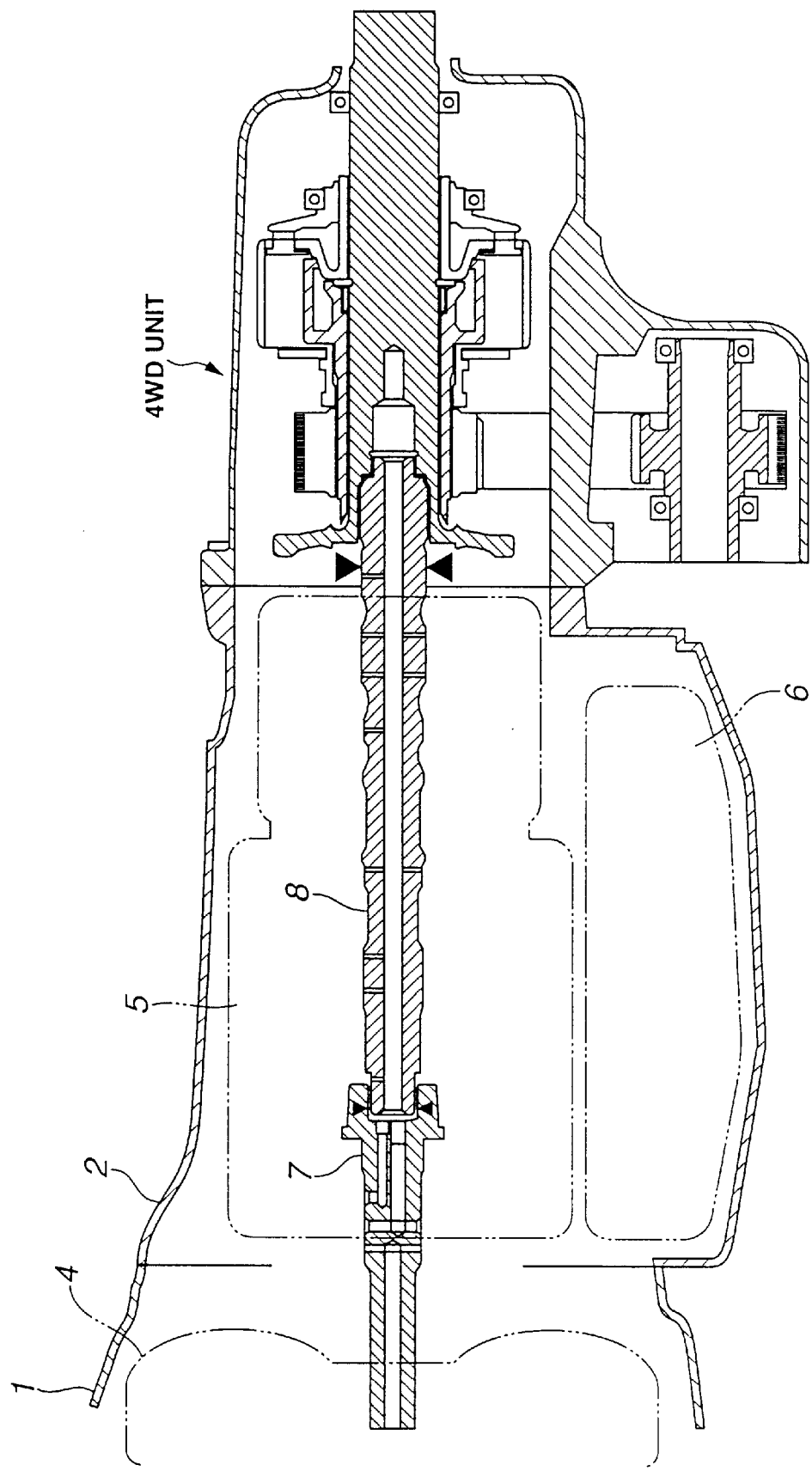
FIG. 12 is a schematic view showing an application of the embodiment according to the present invention to an automatic transmission for four wheel drive (4WD) vehicle.
Figure 13:
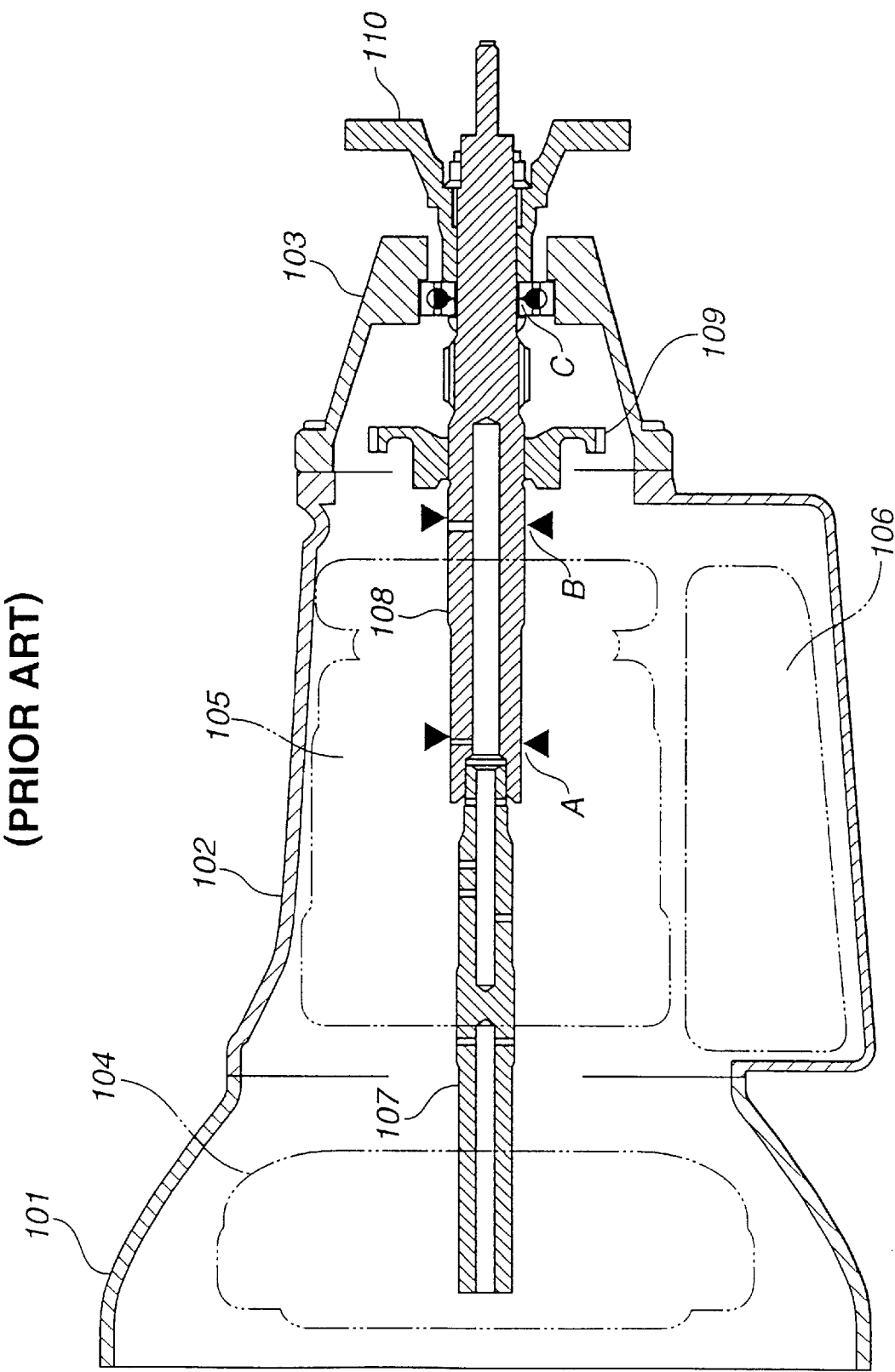
FIG. 13 is a schematic view showing conventional drive shafts of an automatic transmission.

In a case that the output shaft structure according to the present invention is applied to an automatic transmission for a 4WD vehicle, by replacing the rear extension 3 and the second output shaft 9 with a four wheel drive unit, the automatic transmission can be used as an automatic transmission for four wheel drive vehicle. This largely improves the assembly operation of the automatic transmission. FIG. 12 shows a modification of the first embodiment which modification is for the 4WD vehicle.

As described above, the output shaft is constituted by the first output shaft 8 outputting driving force from the gear train 5 and the second output shaft 9 outputting driving force to driving wheels. Further, the parking gear 9a is integral with the second output shaft 9. Therefore, even if the automatic transmission is changed in length to the flange companion 19 according to the variation of the vehicle, it is easily adapted by exchanging the second output shaft 9.

In a case that an automatic transmission of this type is applied to a 4WD vehicle, by replacing the rear extension 3 and the second output shaft 9 with a 4WD unit without replacing the first output shaft 8 connected to the gear train 5, the automatic transmission for four wheel drive vehicle is obtained. This largely improves the assembly operation of the automatic transmission and reduces the production cost of the automatic transmission.

The lubrication passages are provided in both 10 the first and second output shafts 8 and 9. More specifically, the oil passage 8a provided in the first output shaft 8 is a through-hole, and the oil passage 9b is provided in the second output shaft 9 with a short depth due to short length of the second output shaft 9. Therefore, the provision of the lubrication passages in the first and second output shafts 8 and 9 are easily executed as compared with that of the conventional one shaft structure.

In the vicinity of the partition wall 2a provided at the boundary of the transmission case 2 and the rear extension 2, the inner periphery at the second end portion of the first output shaft 8 and the outer periphery at the first end portion of the second output shaft 9 are connected by means of the spline connection. Therefore, it is possible that the output shaft supporting portion (bush) 16 at the partition wall 2a and the spline connect portion 13 can absorb the bending force and the thrust force generated at the driving wheel side. This suppresses the load input from being transmitted from the driving wheels to the gear train 5, and therefore the durability of the gear train 5 is improved.

Further, by the spline connection structure between the first and second output shafts 8 and 9 and the provision of the thrust bearing 12 at the flange portion of the parking gear 9a formed at the outer periphery of the spline connect portion 13, it becomes easy to install the thrust bearing 12, and it becomes possible to enlarge the diameter of the spline connect portion 13 and to decrease the dimension of the automatic transmission in the axial direction.

Furthermore, by dividing the output shaft into the first and second output shafts 8 and 9, it becomes possible to provide the hollow portion in the second output shaft 9. The provision of the hollow portion enables the output shaft to decrease its weight while ensuring the necessary rigidity.

The entire contents of Japanese Patent Application No. 11-296509 filed on Oct. 19, 1999 in Japan are incorporated herein by reference.

Although the invention has been described above by reference to a certain embodiment of the invention, the invention is not limited to the embodiments described above. Modifications and variations of the embodiment described above will occur to those skilled in the art, in light of the above teaching. The scope of the invention is defined with reference to the following claims.

What is claimed is:

1. An output shaft of an automatic transmission, comprising:

a first output shaft outputting a driving force from a gear train of an automatic transmission; and a second output shaft connected to said first output shaft so as to be movable in an axial direction and to be fixed in a rotational direction with respect to said first output shaft, said second output shaft being integral with a parking gear which fixes the second output shaft in rotation when the automatic transmission is set at a parking position.

2. The output shaft as claimed in claim 1, wherein said second output shaft has a hollow portion.

3. The output shaft as claimed in claim 1, wherein an oil passage is provided in each of said first and second output shafts along an axis thereof.

4. An output shaft of an automatic transmission, comprising:
   a first output shaft outputting a drive force from a gear train of an automatic transmission; and
   a second output shaft connected to said first output shaft so as to be movable in an axial direction and to be fixed in a rotational direction with respect to said first output shaft, said second output shaft being integral with a parking gear which fixes the second output shaft in rotation when the automatic transmission is set at a parking position,
   wherein said first output shaft is supported to a first bearing provided at a partition wall located between a transmission case and a rear extension of the automatic transmission, said second output shaft is supported to a second bearing provided at the partition wall and to a third bearing provided at an end portion of said rear extension apart from the transmission case, and said first output shaft is splined to said second output shaft in the rear extension.

5. The output shaft as claimed in claim 4, wherein an outer periphery of an end portion of said first output shaft is splined to an inner periphery of an end portion of said second output shaft, the parking gear is provided at an outer periphery of the end portion of said second output shaft, and the second bearing is disposed at a flange portion of the parking gear.

6. The output shaft as claimed in claim 4, wherein the first bearing includes a bush installed between a through-hole defining surface of the partition wall said first output shaft, the second bearing includes a thrust bearing installed between a wall surface of said partition wall and an end surface of the second output shaft, and the third bearing includes a ball bearing installed between a through-hole defining surface of the rear extension and said second output shaft.

7. An automatic transmission comprising:
   a transmission case having a first end portion connected to an engine of a vehicle and a second end portion having a partition wall;
   a rear extension having a first end portion connected to the second end portion of said transmission case;
   an input shaft receiving a driving force of the engine, a major part of said input shaft being disposed in said transmission case;
   a gear train receiving the driving force from said input shaft and varying a rotation speed of the driving force, said gear train being disposed in said transmission case;
   a first output shaft coaxial with said input shaft and receiving the driving force from said gear train, a major part of said first output shaft being disposed in said transmission case;
   a second output shaft coaxial with said first output shaft and splined to said first output shaft, said second output receiving the driving force from said first output shaft and outputting to the driving wheels of the vehicle, a major part of said second output shaft being disposed in said rear extension; and
   a parking gear integral with said second output shaft.

* * * * *